Jan. 16, 1934.     C. A. ADAMS     1,943,998
CONVEYER
Filed Aug. 13, 1930     2 Sheets-Sheet 1
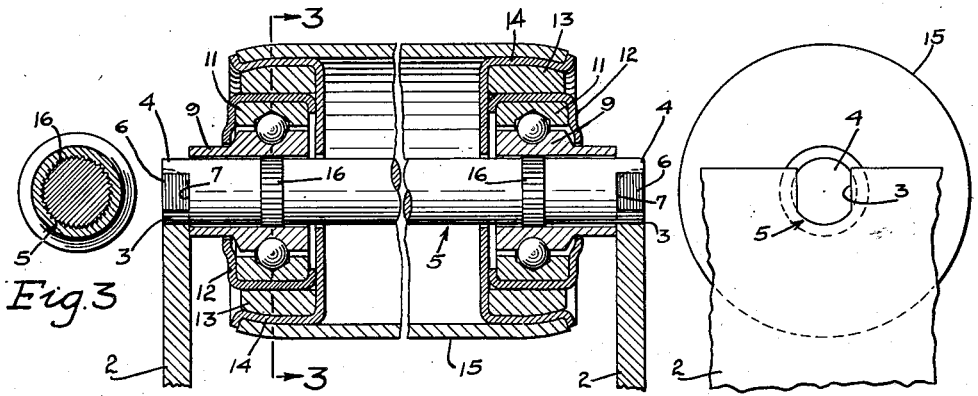
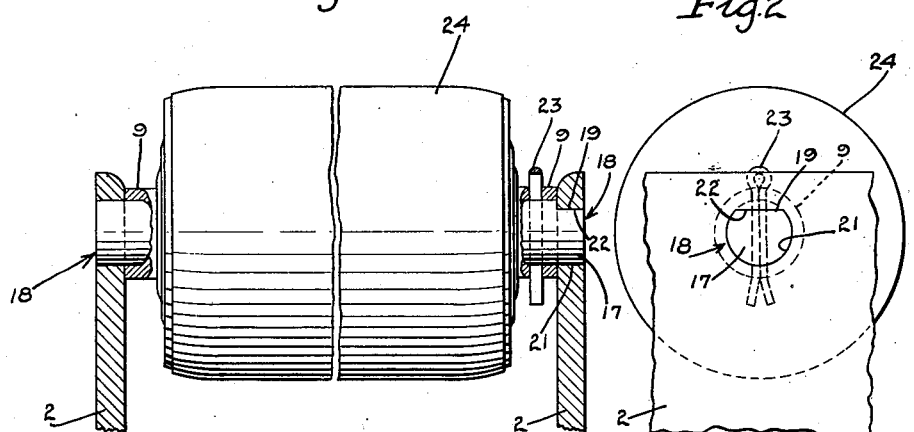
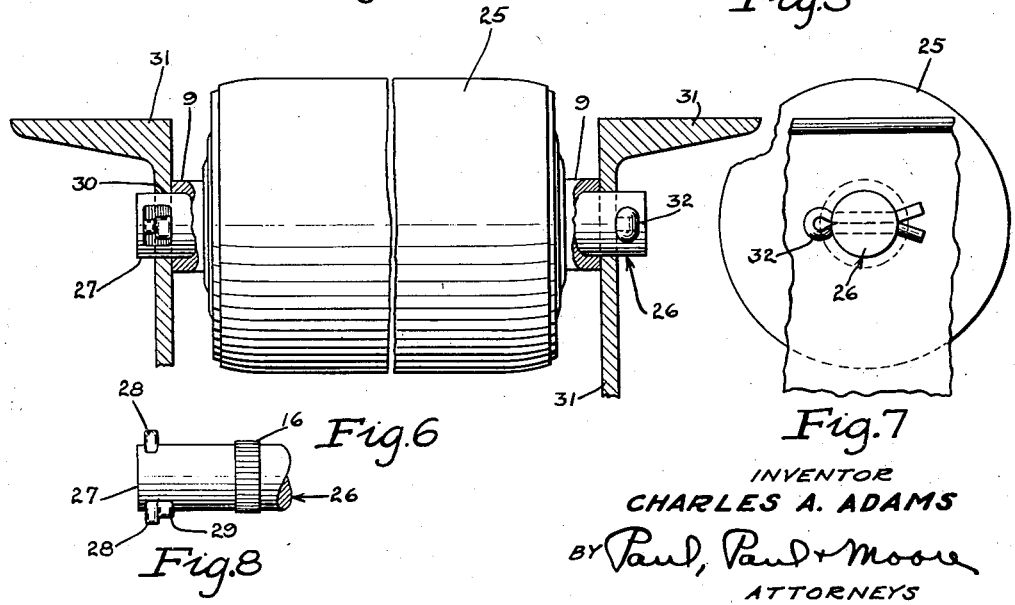
INVENTOR
CHARLES A. ADAMS
BY Paul, Paul + Moore
ATTORNEYS Jan. 16, 1934. C. A. ADAMS 1,943,998
CONVEYER
Filed Aug. 13, 1930 2 Sheets-Sheet 2

INVENTOR
CHARLES A. ADAMS
BY Paul, Paul & Moore
ATTORNEYS

Patented Jan. 16, 1934

1,943,998

UNITED STATES PATENT OFFICE

1,943,998

CONVEYER

Charles A. Adams, Ellwood City, Pa., assignor to Mathews Conveyer Company, Ellwood City, Pa., a corporation of Pennsylvania Application August 13, 1930. Serial No. 474,984

4 Claims. (Cl. 193—37)

This invention relates to new and useful improvements in conveyers of the gravity roller type, and more particularly relates to the construction of the rollers and the supporting axles therefor.

An object of the invention is to provide a conveyer including an axle having anti-friction bearings mounted thereon adapted to rotatably support a roller, and means being provided for locking the inner bearing cones to the axle so that they cannot rotate thereon.

A further object is to provide a conveyer including spaced-apart supports, an axle demountably supported thereon and locked against rotation, anti-friction bearings mounted upon the axle and rotatably supporting a roller, and portions of the axle being knurled or grooved and adapted for interlocking engagement with the inner bearing sleeves or cones to prevent the latter from relatively rotating upon the axle.

A further object is to provide a roller axle having portions of its periphery provided with longitudinally extending grooves and ridges adapted for interlocking engagement with means provided on the bores of the inner bearing cones of the anti-friction bearings to be mounted thereon, to prevent the cones from relatively rotating upon the axle, when the conveyer is in use, and said grooves and ridges permitting the bearing cones to be rotatably adjusted upon the axle to present a new load-carrying surface.

A further object is to provide a roller axle having a bearing cone or sleeve mounted thereon and adapted for interlocking engagement to prevent the cone from relatively rotating upon the axle, and whereby the cone may readily be removed from the axle when necessary.

A further object is to provide a simple and inexpensive roller and axle construction for a conveyer including anti-friction bearings for rotatably supporting the roller upon the axle, means for locking the inner bearing cones against relative rotation upon the axle, and means for locking the axle against rotation.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a sectional detail view showing a roller mounted upon an axle, and the means for locking the inner bearing cones to the axle;

Figure 2 is an end view of Figure 1, showing the means for locking the axle against relative rotation;

Figure 3 is a detail sectional view on the line 3—3 of Figure 1, showing only the axle and inner bearing cone;

Figure 4 is an elevational view showing a cotter pin traversing one of the bearing cones and the axle to lock the axle against relative rotation;

Figure 5 is an end view of Figure 4;

Figure 6 is an elevational view showing means integrally provided upon the axle for preventing relative rotation thereof, and also showing means for preventing longitudinal movement of the axle;

Figure 7 is an end view of Figure 6;

Figure 8 is a detail view showing one end of the axle;

Figures 9, 10:
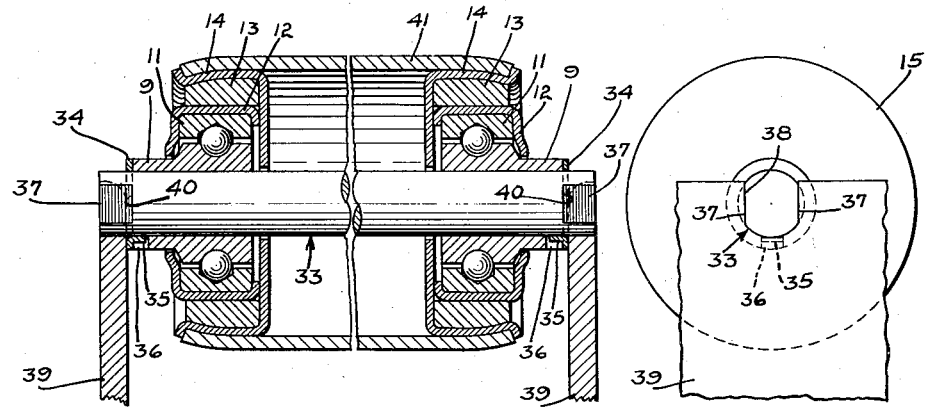
Figure 9 is a longitudinal sectional view showing a construction wherein the bearing cones are locked against relative rotation upon the axle by means of locking washers non-rotatably mounted upon the axle and each provided with a tongue adapted to be received in a recess provided in the end of each bearing cone.
Figure 10 is an end view of Figure 9.

In the selected embodiment of the invention here shown, there is illustrated in Figure 1, a pair of spaced supports 2—2 provided with notches or recesses 3 at their upper edges adapted to receive the terminals 4 of the axle 5. The shaft terminals 4 are provided on opposite sides with flat faces 6 adapted to engage the upright walls of the notches 3, as shown in Figure 2, thereby to prevent the shaft from relatively rotating in the notches 3. The shoulders 7 provided at the inner ends of the faces 6 are adapted to engage the inner surfaces of the side rails 2, and lock the axle against longitudinal movement.

A feature of the present invention resides in the means provided for locking the inner bearing cones 9 against relative rotation upon the axle 5. Each bearing cone 9 is provided with a peripheral groove alined with a similarly shaped groove provided in an outer bearing cone 11, as shown in Figure 1. The outer bearing cone 11 is secured in a housing 12 mounted within an annular member 13, fitted within a cup-shaped member 14 which is suitably secured within the end of the roller 15, as will readily be understood by reference to Figure 1.

The means provided for locking the inner bearing cones 9 against relative rotation upon the axle 5 consists of knurling the portions of the periphery of the axle 5 as shown at 16 in Figure 1. Longitudinally extending grooves are provided in the bores of the bearing cones 9 adapted to register with the longitudinal grooves of the knurling 16, as shown in Figure 3, so that when the cones 9 are mounted upon the axle 5 in their respective places, they will be locked against rotation but may readily be removed from the axle when the latter is disengaged from the supports 2—2, as will be understood by reference to Figure 1.

Figure 4 illustrates a construction wherein the end portion 17 of the axle 18 is provided with a flat face 19 and is adapted to be inserted into an opening 21 provided in the support 2. The flat face 19 registers with a flat face 22 provided in the wall of the aperture 21, so as to positively prevent the shaft from rotating when mounted in the supports 2—2. A cotter pin 23 is inserted through the cone 9 at the right hand side of the roller, and also through the axle 18, whereby the axle will be locked against longitudinal movement. The bearing construction within the roller 24, shown in Figure 4, is similar to that shown in connection with Figure 1.

Figure 6 illustrates a construction wherein the roller 25 is supported upon an axle 26 having its end portion 27 provided with integral projections 28 extending in opposite directions, as shown in Figure 8. A key member 29 is provided upon the shaft 27 adjacent to the projections 28, and is adapted to be received in a notch provided in the wall of an aperture 30, formed in the channel member 31, shown at the left hand side of Figure 6. The projections 28 lock the axle against longitudinal movement in one direction, and a cotter pin 32 is mounted in the opposite end of the axle 26 to prevent longitudinal movement of the axle in the opposite direction. The bearing cones 9 are locked against relative rotation upon the axle 26 by knurling the axle and bores of the cones, as shown in Figure 1.

Figure 9 illustrates a modified construction wherein the bearing cones 9 are locked against rotation upon the axle 33 by means of locking washers 34, each being provided with a tongue 35 adapted to be received in notches 36 provided in the end faces of the bearing cones 9. The terminals of the axle 33 are flattened upon opposite sides, as indicated at 37 and are received in correspondingly shaped notches 38 provided in the upper edges of the supports 39 in a manner similar to that shown and described with referenec to Figure 1. In Figure 9, however, the flattened faces 37 at the ends of the axle are sufficiently long to permit the washers 34 to be seated upon the flattened terminals of the axle so that their inner faces will engage the shoulders 40 provided upon the axle. When the axle is supported in the notches 38 as shown in Figure 10, and the washers are positioned between the end faces of the bearing cones 9 and the adjacent faces of the side rails 39, the axle will be locked against movement and the cones 9 will also be locked against relative rotation upon the axle 33.

Figures 11, 12:
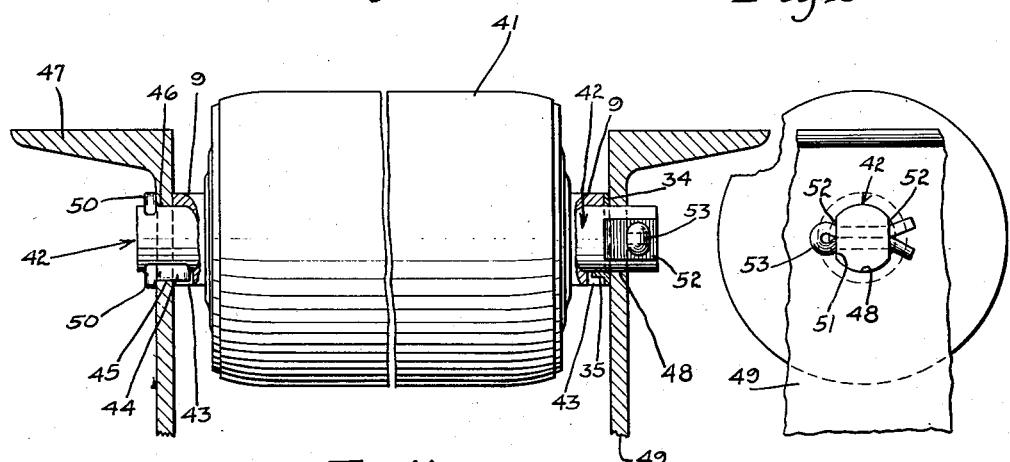
Figure 11 is a view showing one of the bearing cones locked against rotation by a washer similar to the one shown in Figure 9, and the cone at the other end of the axle locked against rotation by means of a projection provided upon the axle.
Figure 12 is an end view of Figure 11.
Figure 13:
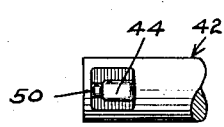
Figure 13 is a bottom view of one end of the axle shown in Figure 11.

In Figure 11, a roller 41 is shown mounted upon an axle 42 by means of bearings similar to those shown in Figures 1 and 9, each including an inner bearing cone 9 provided with a notch 43. The axle 42 is provided at one end with an integral key member 44 adapted to be seated in a notch 45 provided in the bore of an aperture 46 in which one end of the axle 42 is mounted. Lateral projections 50 are also provided upon the axle 42 adapted to engage the outer face of the supporting rail 47 shown at the left hand side of Figure 11. The bearing cone 9 at the opposite end of the axle is locked against rotation by means of a lock washer 34 similar to the one shown and described with reference to Figure 9.

The aperture 48 provided in the right hand rail 49 is provided with flattened wall portions 51 adapted to coincide with similarly shaped wall portions 52 provided upon the adjacent end of the axle, as shown in Figures 11 and 12. A suitable cotter pin 53 cooperates with the projections 50 to lock the axle against longitudinal movement. When the cotter pin 53 is removed from the axle 42, the latter may be removed from the supports 47 and 49 by translating the axle in a direction towards the left, when viewed as shown in Figure 11.

By knurling portions of the axle and grooving the bores of the inner bearing cones 9, as shown and described with reference to Figures 1 to 8, inclusive, the bearing cones will be positively locked against rotation upon the axle but, at the same time, may readily be removed therefrom when it is found necessary to detach them from the axle. The flattened faces 6 and shoulders 7 provide means for positively locking the axle against movement during operation of the conveyer. It is to be understood that the number of grooves and ridges provided in each knurled axle portion corresponds to members of similar grooves and ridges provided in the bore of the cones, so that the cones may be fitted onto the axles and over the knurled portions 16 thereof without any difficulty. The means for locking the axle against longitudinal and rotary movements with respect to the side rails 2—2, is also very simple and provides a very practical and efficient structure.

When the cones are thus locked against rotation upon the axle, they may be rotatably adjusted thereon when the load-supporting surface thereof becomes worn, which prolongs the useful life of the bearings. For instance, when the upper portion of the bearing groove, indicated at A in Figure 1, becomes worn from continually carrying the load, the cone may be moved longitudinally upon the axle until the bore of the cone moves out of engagement with the knurled portion 16 of the axle, whereupon it may be rotatably adjusted upon the axle to present a new wearing surface to the load. To make this adjustment, it is, of course, necessary to remove the axle from the supports 2—2, or at least one end thereof.

I claim as my invention:

1. A conveyer roller comprising a tubular roller having an antifriction bearing adjacent each end thereof, said bearings each being an independent completely assembled unit structure, an axle extending through said bearings, said axle and bearings having detachable integrally formed interengaging means to prevent relative rotation between said bearings and axle, and said axle being longitudinally removable from said bearings and roller.

2. A conveyer roller comprising a tubular roller, an independent antifriction bearing unit assembly detachably fitted into each end thereof, and an axle extending through said roller and bearings, said axle and bearings having detachable integrally formed interengaging means to prevent relative rotation but permitting a floating longitudinal movement between said bearings and axle, said axle being longitudinally removable from said bearings and roller.

3. A conveyer roller comprising a tubular roller having an independent antifriction bearing assembly adjacent each end thereof, an axle extending through said bearings, said axle having spaced knurled portions defining longitudinal teeth and said bearings having complementary surfaces engageable with said knurled portions to prevent relative rotation but permitting longitudinal movement between said bearings and axle, said axle being longitudinally removable from said bearings and roller.

4. In a conveyer structure, spaced side rails, axles extending between said side rails and fixed against rotation with respect thereto, a pair of anti-friction bearings mounted on each axle in spaced relation, said bearings each being a completely assembled unit structure, said bearings and axle having detachable integrally formed interengaging means to prevent relative rotation between said bearings and axle, a roller mounted on said bearings and each axle being longitudinally removable from said bearings and roller and side rails.

CHARLES A. ADAMS.